US011372076B2

(12) United States Patent
Alexander et al.

(10) Patent No.: US 11,372,076 B2
(45) Date of Patent: Jun. 28, 2022

(54) METHOD AND SYSTEM FOR ESTIMATING RANGE BETWEEN AND POSITION OF OBJECTS USING A WIRELESS COMMUNICATION SYSTEM

(71) Applicant: Cohda Wireless Pty Ltd., Wayville (AU)

(72) Inventors: Paul Dean Alexander, Wayville (AU); Malik Khan, Wayville (AU); John Lawrence Buetefuer, Wayville (AU); Mohamed Elbanhawi, Wayville (AU); Kukulage Nomal Samunda Perera, Wayville (AU); Lachlan Travis Robinson, Wayville (AU)

(73) Assignee: Cohda Wireless Pty Ltd., Wayville (AU)

( * ) Notice: Subject to any disclaimer, the term of this patent is extended or adjusted under 35 U.S.C. 154(b) by 244 days.

(21) Appl. No.: 16/510,819

(22) Filed: Jul. 12, 2019

(65) Prior Publication Data
US 2020/0018816 A1   Jan. 16, 2020

(30) Foreign Application Priority Data
Jul. 12, 2018   (AU) ............................... 2018902520

(51) Int. Cl.
*G01S 3/02*   (2006.01)
*G01S 5/02*   (2010.01)
*G01S 5/14*   (2006.01)

(52) U.S. Cl.
CPC .............. *G01S 5/0273* (2013.01); *G01S 5/14* (2013.01); *G01S 5/0215* (2013.01)

(58) Field of Classification Search
CPC ......... G01S 5/0273; G01S 5/0215; G01S 5/14
(Continued)

(56) References Cited

U.S. PATENT DOCUMENTS

| 6,073,032 A * | 6/2000 | Keskitalo ............... H04B 7/086 455/562.1 |
| 6,486,831 B1 * | 11/2002 | Martorana .............. G01S 5/021 342/458 |

(Continued)

FOREIGN PATENT DOCUMENTS

| WO | WO-2018/074958 A1 | 4/2018 |
| WO | WO-2018/106467 A1 | 6/2018 |

OTHER PUBLICATIONS

"U.S. Appl. No. 16/557,554, No-Final Office Action dated Dec. 4, 2019", 9 pgs.
(Continued)

*Primary Examiner* — Chuong P Nguyen
(74) *Attorney, Agent, or Firm* — Schwegman Lundberg & Woessner, P.A.

(57) ABSTRACT

Methods and systems for estimating range between a first device and a second device using at least one wireless communication channel defined between the first and second devices are disclosed. The method comprises: obtaining a set of range measurements, wherein the range measurements include measurements associated with multiple paths taken by signals between the first and second devices; discarding over-ranges caused by multiple signal paths using a variable threshold; and processing the remaining range measurements to obtain an estimated range.

19 Claims, 9 Drawing Sheets

(58) Field of Classification Search
USPC .......................................................... 342/451
See application file for complete search history.

(56) References Cited

U.S. PATENT DOCUMENTS

| | | | | |
|---|---|---|---|---|
| 6,892,055 | B2* | 5/2005 | Rosenfeld | G01S 5/02 342/357.61 |
| 7,271,764 | B2* | 9/2007 | Golden | G01S 5/0215 342/420 |
| 7,468,696 | B2* | 12/2008 | Bornholdt | G01S 5/14 342/387 |
| 9,008,584 | B2* | 4/2015 | Alexander | G01S 13/003 340/552 |
| 9,083,419 | B2* | 7/2015 | Alexander | H04L 25/0242 |
| 9,319,157 | B2* | 4/2016 | Alexander | H04B 17/391 |
| 2002/0171586 | A1 | 11/2002 | Martorana et al. | |
| 2008/0143603 | A1 | 6/2008 | Bornholdt | |
| 2012/0182935 | A1 | 7/2012 | Addepalli et al. | |
| 2012/0309415 | A1* | 12/2012 | Rhoads | G01S 5/0289 455/501 |
| 2014/0195102 | A1 | 7/2014 | Nathanson | |
| 2015/0247730 | A1 | 9/2015 | Calmettes et al. | |
| 2015/0331099 | A1 | 11/2015 | Wu et al. | |
| 2016/0195600 | A1 | 7/2016 | Feldman et al. | |
| 2016/0277196 | A1 | 9/2016 | Jose et al. | |
| 2016/0285935 | A1 | 9/2016 | Wu et al. | |
| 2017/0082729 | A1* | 3/2017 | Bar-Shalom | G01S 5/12 |
| 2017/0215119 | A1 | 7/2017 | Hong et al. | |
| 2017/0230940 | A1 | 8/2017 | Jung et al. | |
| 2018/0139593 | A1 | 5/2018 | Chun et al. | |
| 2018/0299273 | A1 | 10/2018 | Cai et al. | |
| 2018/0332585 | A1 | 11/2018 | Faurie et al. | |
| 2019/0028897 | A1 | 1/2019 | Ying et al. | |
| 2019/0045034 | A1 | 2/2019 | Alam | |
| 2019/0075548 | A1 | 3/2019 | Lee et al. | |
| 2019/0221110 | A1 | 7/2019 | Vanderveen et al. | |
| 2019/0268447 | A1 | 8/2019 | Yang et al. | |
| 2020/0077238 | A1 | 3/2020 | Alexander et al. | |
| 2021/0028799 | A1* | 1/2021 | Naguib | G01S 13/88 |

OTHER PUBLICATIONS

"Australian Application No. 2018903227, International-type search for provisional patent application dated Jun. 7, 2019", (Jun. 7, 2019), 21 pgs.

"European Application Serial No. 19185826.5, European Search Report dated Oct. 30, 2019", 11 pgs.

Nam, Wooseok, et al., "Least-Squares-Based Iterative Multipath Super-Resolution Technique", *IEEE Transactions on Signal Processing*, 61(3), (2013), 519-529.

Venkatesh, S., et al., "Non-line-of-sight identification in ultra-wideband systems based on received signal statistics", *IET Microwaves Antennas & Propagation*, 1(6), (Jan. 2008), 1120-1130.

"U.S. Appl. No. 16/557,554, Response filed Mar. 4, 2020 to Non-Final Office Action dated Dec. 4, 2019", 11 pgs.

"European Application No. 19194672.2, Extended European Search Report dated Jan. 16, 2020", (Jan. 16, 2020), 9 pgs.

"U.S. Appl. No. 16/557,554, Advisory Action dated Oct. 19, 2020", 3 pgs.

"U.S. Appl. No. 16/557,554, Examiner Interview Summary dated Nov. 3, 2020", 2 pgs.

"U.S. Appl. No. 16/557,554, Final Office Action dated Jun. 10, 2020", 10 pgs.

"U.S. Appl. No. 16/557,554, Notice of Allowance dated Dec. 10, 2020", 14 pgs.

"U.S. Appl. No. 16/557,554, Response filed Sep. 30, 2020 to Final Office Action dated Jun. 10, 2020", 14 pgs.

"European Application No. 19185826.5, Communication pursuant to Article 94(3) dated Oct. 23, 2020", (Oct. 23, 2020), 10 pgs.

"European Application No. 19194672.2, Office Action dated Nov. 25, 2020", 9 pgs.

* cited by examiner

METHOD AND SYSTEM FOR ESTIMATING RANGE BETWEEN AND POSITION OF OBJECTS USING A WIRELESS COMMUNICATION SYSTEM

CLAIM OF PRIORITY

This application claims the benefit of priority of Australia Patent Application No. 2018902520, filed on 12 Jul. 2018, the benefit of priority of which is claimed hereby, and which is incorporated by reference herein in its entirety.

TECHNICAL FIELD

Aspects of the present invention relate to methods and systems for estimating the range between and/or position of objects using a wireless communication system.

BACKGROUND

An accurate position of an object such as a vehicle is required in many applications. Global Navigation Satellite System (GNSS) is an example of a positioning system which uses satellites orbiting around the earth to determine the position of an object at any given time. The GNSS positioning system suffers from multi-path extensions caused by urban canyons. Multi-path extensions are the multiple paths taken by GNSS signals as they bounce off buildings and other infrastructural elements. In addition, GNSS based systems do not work in undercover scenarios, for example in car parks, homes, and tunnels. This is because objects located in undercover scenarios may not be able to connect with enough number of satellites to calculate the object's position. Therefore, the GNSS system is generally augmented with inertial sensors to provide a dead reckoning solution in these challenging scenarios. However, these augmentations, unless corrected, can accumulate errors over time and will lead to increase in measurement errors.

A new generation of terrestrial positioning systems has recently been introduced to determine the position of objects. In particular, these systems determine the distance (referred to as range hereinafter) between an object such as a moving vehicle (whose position is unknown) and one or more infrastructure devices (whose positions are known) and use this measurement to determine the position of the object. The accuracy of the determined range or position depends on the ranging information to these infrastructure devices. The infrastructure devices could be wireless base stations (e.g. LTE eNB, V2X Road Side Units (RSUs), WiFi Access Points (APs) or ultra-wide band (UWB) anchors, Radio broadcast units (RBS), or Video Broadcast Units (VBS)). Different active and passive mechanisms can be used to calculate range to these infrastructure elements (IE). E.g. IEEE Fine timing Measurement (FTM) based active mechanisms can be used to get ranging information for WiFi based devices. Passive mechanisms such as time difference of arrival based ranging estimates can be used in hyperbolic positioning solutions. In a first example, a Wi-Fi station such as a mobile phone sends out periodic broadcast short packets (like IEEE 802.11 Null frames) which are received by different AP's in its vicinity, then the time difference of arrival based positioning solutions can be employed to determine the position of the device. This example assumes that the positioning engine is running in the cloud. In another example of passive mechanism, a station is employed to passively listen to ranging information contained in the IEEE FTM messages between multiple AP's, and utilize this information to determine its position without active participation.

The multi-paths in the wireless communications channel between a transmitter (Tx) and a receiver (Rx) caused by obstructions in the environment severely degrade the ranging performance of such terrestrial systems. Ideally, a ranging solution should know very accurately when it sent a packet (e.g. at antenna port) and when it received a packet in response (e.g. Data and ACK mechanism in IEEE 802.11 systems). In addition, ranging solutions need to remove any standard based delay (e.g. 16 microsecond SIFS time gap (Short Interframe Space time) between a unicast IEEE 802.11 Data and ACK frames). These delays could either be estimated or sent in the configuration or setup messages. Each path delay is proportional to distance the signal has traveled from the Tx to the Rx. If the main line of sight (LOS) path component of the signal is extremely weak because of obstruction, then some other path could be identified as the first path. If ranging is then based on a non-LOS path, then it would cause over-ranging or range extension. This over-ranging can cause position estimation error.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY

In accordance with a first aspect there is provided a method for estimating range between a first device and a second device using at least one wireless communication channel defined between the first and second devices, the method comprising: obtaining a set of range, wherein the range measurements include measurements associated with multiple paths taken by signals between the first and second devices; discarding over-ranges caused by multiple signal paths using a variable threshold; and processing the remaining range measurements to obtain an estimated range.

In accordance with a second aspect there is provided a system for estimating range between a first and a second device using at least one wireless communication channel defined between the first and second devices, the system comprising: a receiver for obtaining the set of range measurements from the first device using the wireless communication channel, wherein the range measurements include measurements associated with multiple paths taken by signals of the wireless communication channel to travel between the first and second devices, and a processor comprising; a module for discarding over-ranges caused by multiple paths using a variable threshold, and a module for processing the remaining range measurements to obtain an estimated range.

In accordance with a third aspect there is provided a computer readable program for estimating range between a first device and a second device using at least one wireless communication channel defined between the first and second devices, the computer readable program including instructions to carry out the method of the first aspect.

In accordance with a fourth aspect there is provided method for estimating position of a first device by estimating range between the first device and a plurality of second devices using wireless communication channels defined between the first and the plurality of second devices, the method comprising: obtaining multiple sets of range measurements corresponding to the plurality of second devices, wherein each of the multiple sets of range measurements include measurements associated with multiple paths taken by signals between the first device and a corresponding second device; discarding, for each set of range measurements, over-ranges caused by multiple signal paths using a variable threshold; processing, for each set of range measurements, the remaining range measurements to obtain estimated ranges corresponding to the plurality of second devices, and processing the estimated ranges corresponding to the plurality of second devices to obtain an estimated position of the first device.

In an embodiment, the discarding of over-ranges is an iterative process and the variable threshold is updated at the end of each iteration.

In an embodiment, the iterative process of discarding over-ranges is stopped when a threshold number of range measurements from the set of range measurements are left below a profile of the estimated range obtained from a previous iteration.

In an embodiment, the threshold number of range measurements is a fixed percentile value of total number of measurements in the set of range measurements.

In an embodiment, a pre-processing step is performed prior to the step of discarding over-ranges.

In an embodiment, the pre-processing step is performed to define a preliminary range profile.

In an embodiment, the pre-processing step comprises filtering over-ranges using a median filter.

In an embodiment, the median filter is configured to filter over-ranges using a window length K and a percentile threshold P_thr.

In an embodiment, the pre-processing step comprises the step of using line or quadratic or spline fit on the set of range measurements to obtain the preliminary range profile.

In an embodiment, the method is used for estimating range when at least one of the devices has a known position to determine the position of the other device.

In an embodiment, the pre-processing step comprises the use of speed measurements to obtain a preliminary range profile, wherein the speed measurements correspond to that one of the first and second devices which is moving.

In an embodiment, a pre-filter is used to filter the set of range measurements to minimize over-ranges caused by multi-path extensions.

In an embodiment, a post-filter is used to filter the estimated range based on standard deviation/variance of the estimated range.

In an embodiment, a post-filter is used to filter the infrastructure elements to be used for positioning.

In an embodiment, the second device is configured to obtain the set of range measurements from the first device.

In an embodiment, the second device is an infrastructure device of the system configured to transmit/receive signals to/from other devices, and the first device is fitted to a vehicle.

In an embodiment, the receiver for obtaining the set of ranges measurements from the first device comprises a range module.

In an embodiment, the module for discarding over-ranges caused by multiple paths is implemented in a range tracker module.

In an embodiment, the module for processing the remaining range measurements to obtain an estimated range is implemented in a position fusion engine.

In an embodiment, the range tracker module is configured to discard over-ranges using an iterative process and the variable threshold is updated at the end of each iteration.

In an embodiment, the range tracker module is configured to stop the iterative process when a threshold number of range measurements from the set of range measurements are left below a profile of the estimated range obtained from a previous iteration.

In an embodiment, the threshold number of range measurements is a fixed percentile value of total number of measurements in the set of range measurements.

In an embodiment, the range tracker module is configured to perform pre-processing of the set of range measurements prior to performing the step of discarding over-ranges.

In an embodiment, the range tracker module is configured to perform pre-processing of the set of range measurements to define a preliminary range profile.

In an embodiment, the range tracker module is configured to perform pre-processing for filtering over-ranges using a median filter.

In an embodiment, the range tracker module is configured to perform pre-processing step using line or quadratic or spline fit on the set of range measurements to obtain the preliminary range profile.

In an embodiment, the range tracker module is configured to perform pre-processing using line or quadratic or spline fit on the median filtered range measurements to obtain the preliminary range profile.

In an embodiment, the system is configured to estimate range either when both the first and second devices are stationary or when one of the devices is moving and the remaining device is stationary.

In an embodiment, the range tracker module is configured to perform pre-processing using speed measurements to obtain a preliminary range profile, wherein the speed measurements correspond to that one of the first and second devices which is moving.

In an embodiment, the system includes a speed module for obtaining the speed measurements of the moving device.

In an embodiment, the system includes a pre-filter module to filter the set of range measurements to minimize over-ranges caused by multi-path extensions.

In an embodiment, the system includes a post-filter module to filter the estimated range based on standard deviation/variance of the estimated range.

In an embodiment, the system includes a post-filter to filter the infrastructure elements to be used for positioning.

BRIEF DESCRIPTION OF THE DRAWINGS

Embodiments of the present disclosure will now be described with reference to the drawings, in which.

DESCRIPTION OF EMBODIMENTS

Embodiments of the present disclosure provide a method for estimating range between a first device and a second device using at least one wireless communication channel defined between the first and second devices.

Various different types of wireless communications channels or standards may be employed, including DVB-T, DVB-T2, DVB-H, IEE802.11, IEEE 802.16, 3GPP, 3GPP2, 4G, 5G, Dedicated Short range Communications (DSRC), Communications Access for Land Mobiles (CALM), and various proprietary systems.

Figure 1:
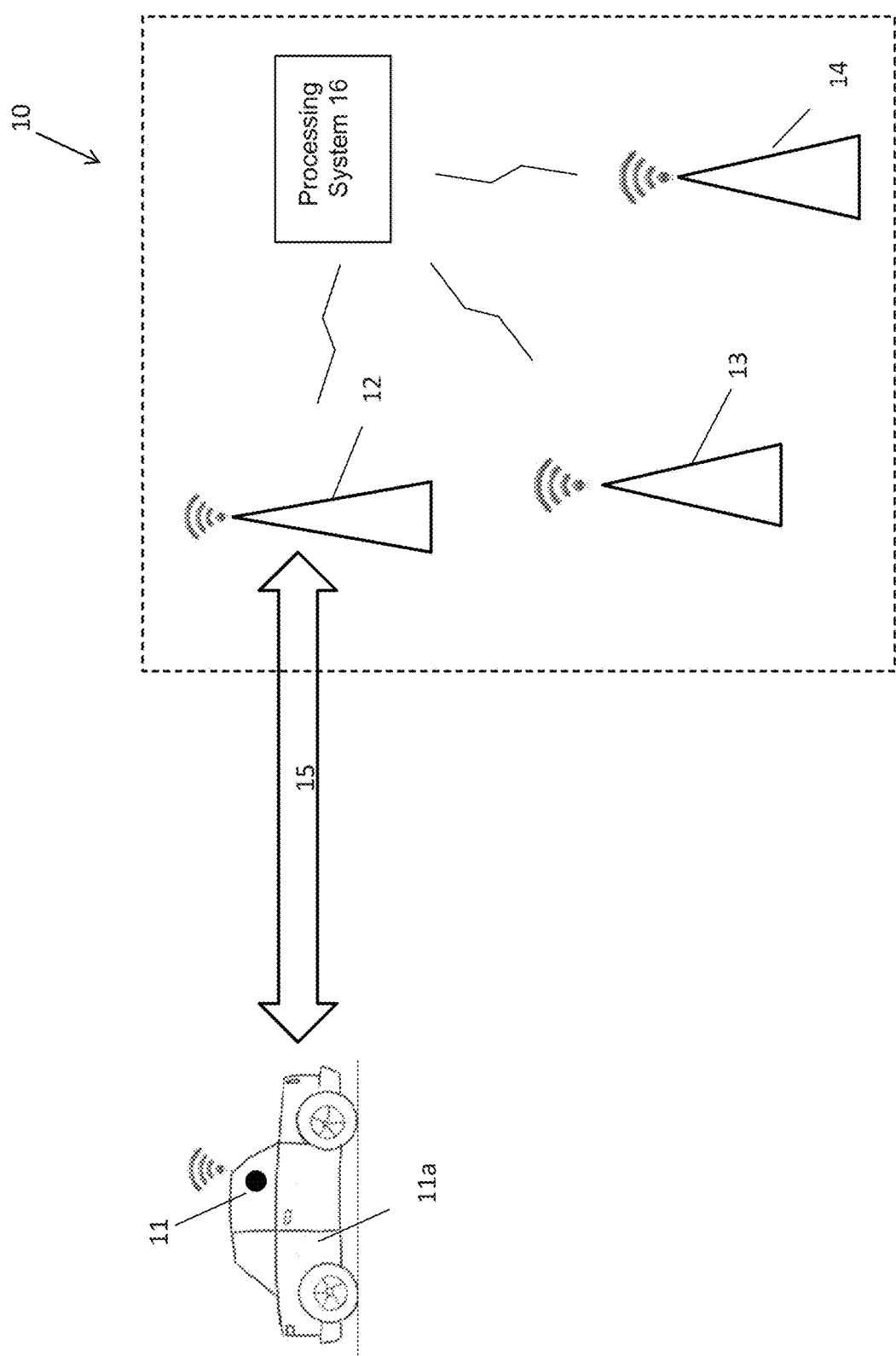
FIG. 1 shows a terrestrial positioning system for estimating range between and position of objects using a wireless communication channel.

In FIG. 1, there is shown a terrestrial positioning system 10 for estimating range between and position of objects using a wireless communication channel. The system 10 comprises a processing system 16 in wireless communication with multiple infrastructure devices 12, 13 and 14. These infrastructure devices can be stationary (e.g., roadside units or RSU's) or moving, and their exact location is known or can be easily determined e.g., using GNSS. There is also shown a vehicle 11a, whose location is unknown and is to be determined using the terrestrial positioning system 10. The vehicle 11a can be stationary or moving. A first device 11 including a transceiver unit is carried on the vehicle 11a.

In order to determine the position of the vehicle 11a, the terrestrial positioning system 10 estimates the range between the vehicle 11a and one or more of the infrastructure devices (e.g., device 12, also referred to as the second device 12). Alternatively, the first device 11 may estimate the range to the second device 12 to determine the position of the vehicle 11a. Knowing a precise estimation of the range between the first device 11 and the infrastructure device 12, and the location of the infrastructure device 12, position of the vehicle 11a can be determined. In an embodiment, additional data comprising, e.g., an estimate of the vehicle's position from GNSS, vehicle's speed, and vehicle's direction of motion etc., can be combined with the estimated range for determining the position co-ordinates of the vehicle 11a.

In an embodiment, to determine the range between the vehicle 11a and the infrastructure device 12, a wireless communication channel 15 is established between the first device 11 and the infrastructure device 12. The wireless communication channel 15 is used to send one or more signals from the infrastructure device 12 to the first device 11, or vice versa. In an embodiment, a plurality of consecutive signals is sent from the infrastructure device 12 to the first device 11 (or vice versa). The consecutive signals have a pre-defined time lag, for example a time lag of 0.1 second. The signals received at the first device 11 are then acknowledged to the infrastructure device 12. The acknowledged signals at device 12 provide the range information i.e., the time elapsed to undertake the return trip. Knowing the speed of the signal, the total distance (range information) traveled during the return trip can be determined. It will be appreciated that the consecutive signals may be transmitted from the first device (i.e. vehicle transceiver) 11 to the infrastructure device 12 where they are received and acknowledged to the first device (vehicle transceiver) 11.

Figure 2:
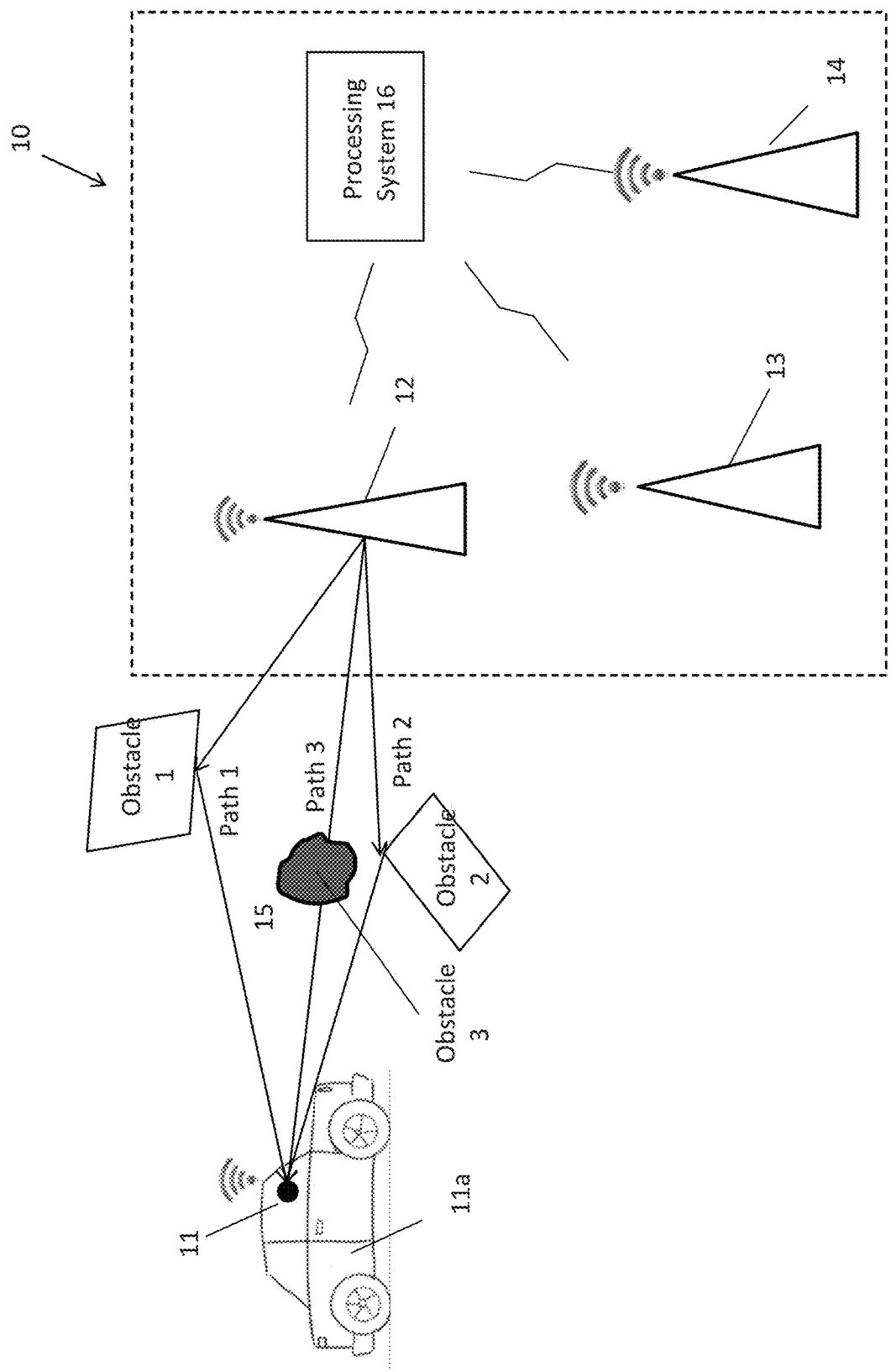
FIG. 2 illustrates over-ranges caused by multi-path extensions established by the signals travelling between an infrastructure device and a stationary/moving vehicle.

The signals travelling between an infrastructure device and another device such as a vehicle (whose position is to be determined) can bounce off non-penetrable obstacles such as, buildings, infrastructure and other obstacles, or obstacles which are penetrable but reduce the signal strength. Therefore, the signals travelling between the two devices can travel via multiple paths (or multi-path extensions). FIG. 2 illustrates this concept. In particular, FIG. 2 illustrates three signal paths (path 1, path 2 and path 3) between the first device 11 and the infrastructure device 12 taken by a single transmission from the infrastructure device 12 to the first device 11. The paths include a LOS path (i.e., path 3) and two non-LOS paths (i.e., path 1 and path 2) reflecting off obstacles 1 and 2. The non-LOS paths 1 and 2 may be predominant because of obstacle 3 between the first device 11 and the infrastructure device 12. The non-LOS paths are problematic as the signals travelling via these paths are delayed and provide extended range data (referred to as over-ranges hereinafter) to the terrestrial positioning system. The over-ranging measurements cause error in the range/position estimation.

Typically, the probability distribution of the LOS path range measurements is Gaussian. However, the non-LOS paths cause the probability distribution of the range measurements to be non-Gaussian, typically in the form of a Rayleigh distribution. This can lead to issues if the range estimation is carried out with solutions assuming Gaussian sensor error distribution, for example, using an Extended Kalman filter (EKF). Therefore, it is critical to either correctly identify the LOS paths, or at least discard the measurements which are based on non-LOS paths.

The presently disclosed systems and methods address the problem of multi-path extensions in order to provide an accurate estimation of range between two devices. Embodiments of the present disclosure disclose data processing techniques for discarding the over-ranging measurements caused by non-LOS paths from the range measurements.

Figure 3:
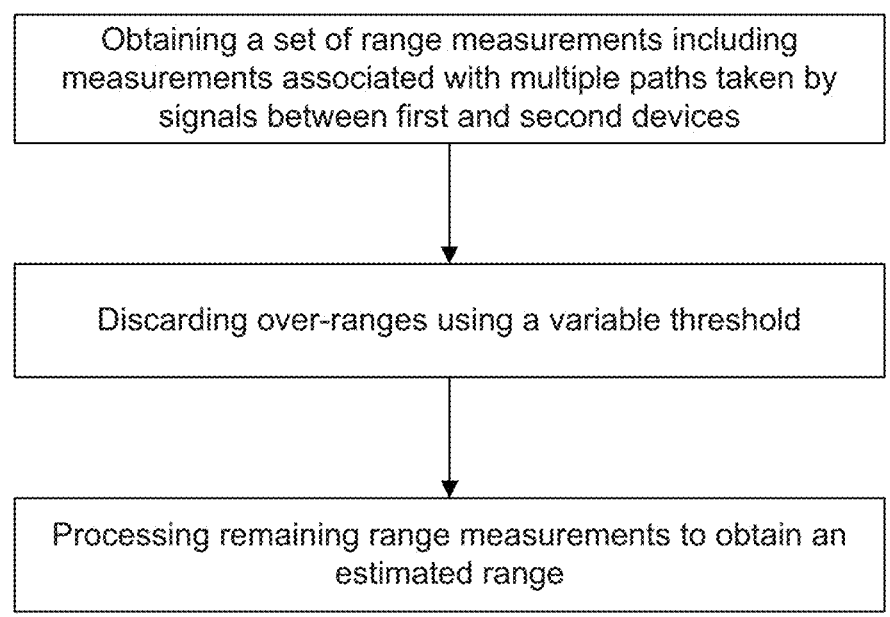
FIG. 3 is a flow diagram showing the steps of a method for estimating range between two communication devices, in accordance with an embodiment of the invention.

FIG. 3 is a flow diagram showing the steps of a method 30 for a method for estimating range between a first device and a second device using at least one wireless communication channel defined between the first and second devices.

As described previously, a first device may send communication signals to a second device. The second device may receive these signals and send acknowledgment signals back to the first device. Each of the acknowledgement signals received at the first or second device comprise relevant information to recognize which originally transmitted signal it belongs to. This information is required to calculate the range (or distance) traveled by the signals between the first and second devices 11, 12. In one embodiment, in an IEEE 802 protocol, a unicast data packet is acknowledged by an acknowledgement (ACK) packet with a known delay (32 micro-second). In another embodiment, an IEEE FTM like protocol can be used for ranging and to recognize the transmitted signals.

At step 31, a set of range measurements are obtained by calculating the distance traveled by each of the signals between the first and second devices 11, 12. The obtained range measurements include measurements associated with multiple paths (both LOS and non-LOS paths) taken by the signals. The range measurements appearing from non-LOS paths are called over-ranges.

At step 32, over-ranges caused by multiple paths are discarded using a variable threshold. At step 33, the remaining range measurements are processed to obtain an estimate of the range.

In the present disclosure, one or more range measurements are processed to detect the over ranging caused by multi-path extensions. In one embodiment, the ranges are filtered according to a threshold. The threshold is not a simple value-based threshold, but is a variable threshold and it can depend on multiple input signals (e.g. range measurements and speed data). In addition, the present disclosure does not require any modification at the physical layer to do any enhancements to suppress multi-path extensions.

Figure 4:
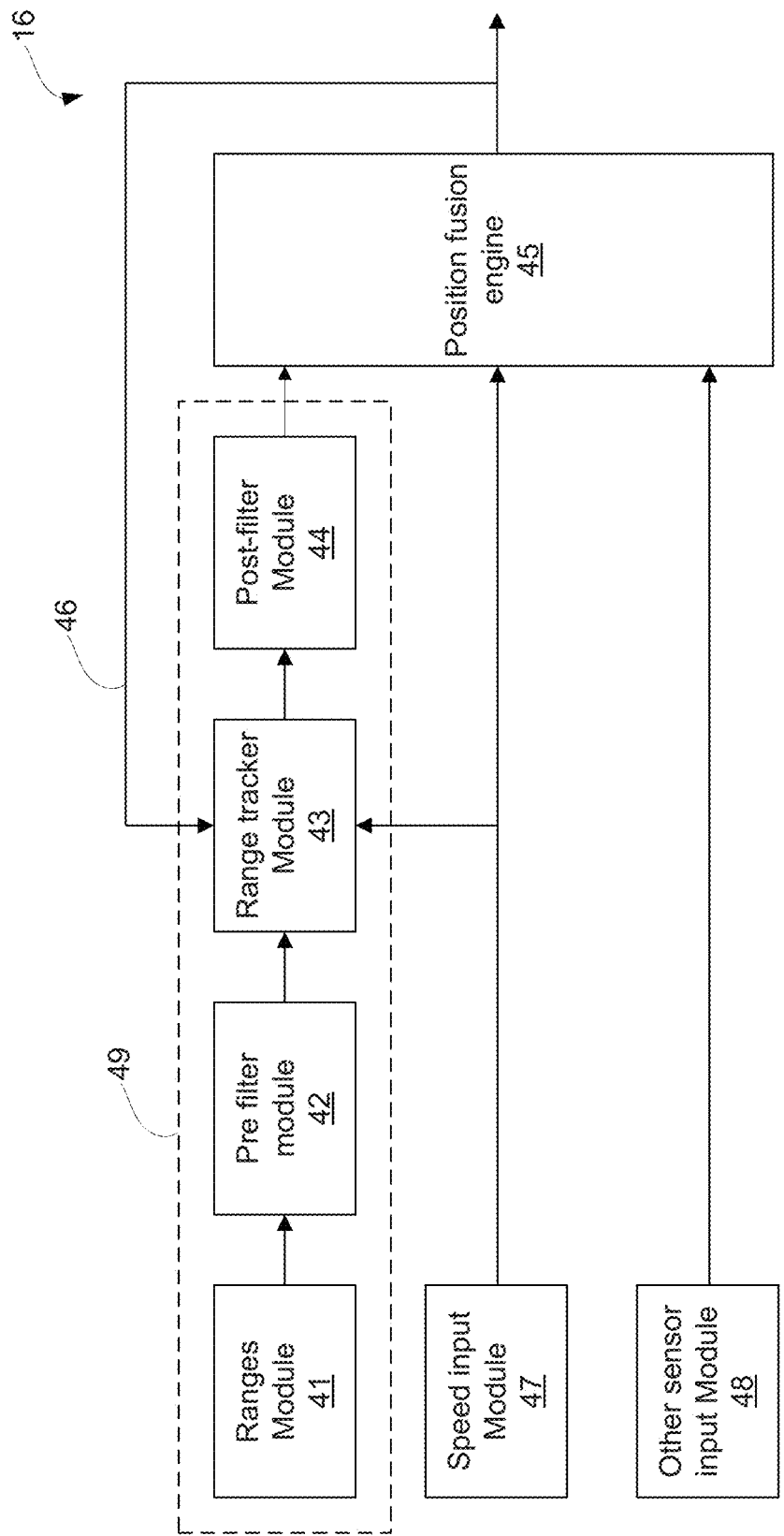
FIG. 4 shows the components of a processing system for determining the position of a stationary/moving object.

FIG. 4 shows a diagram of the processing system 16 for determining the position of an object e.g. a stationary/moving vehicle (e.g. vehicle 11a in FIGS. 1 and 2). The processing system 16 includes a number of modules that are configured to process signals and determine the position of an object. These modules include a ranges module 41, a pre-filter module 42, a range tracker module 43, a post filter module 44, and a fusion engine 45. In addition to these, in some embodiments, the processing system 16 also includes a speed input module 47 and another sensor input module 48. Although these modules are illustrated as separate modules, it will be appreciated that the functions performed by these modules may be combined and performed by fewer modules.

As described previously, a series of signals are exchanged a first and second device. The first device 11, upon receiving a signal of the series of signals, acknowledges the signal to the infrastructure device 12. The series of signals arrive at the infrastructure device 12 at different arrival times. This data is sent to the processing system 16 where the data is processed to obtain range measurements (i.e., the distance traveled by each signal from the infrastructure device 12 to the first device 11). Alternatively, the first device 11 may initially transmit the signal to the infrastructure device 12 which may in turn acknowledge the signals to the first device 11. In a still further embodiment, the first device 11 may transmit signals to the infrastructure device 12 with the signals being received and processed without being acknowledged, in which case the first and infrastructure devices must be regularly synchronized.

The range measurements $r_i$ are obtained from the infrastructure device 12 (the infrastructure device can be a mad side unit (RSU) or AP or Ultra-Wide Band (UWB) Anchor) and are collected in the ranges module 41 using an input buffer or the like. In an embodiment, criteria-based pre-filtering is applied to the obtained range measurements $r_i$ using the pre-filter module 42. The range tracker module 43 provides an estimation of the range by discarding the over-ranges caused by multiple paths using a variable threshold.

In an embodiment, the estimated range determined by the range tracker module 43 is filtered by a post-filter module 44 (if required). The post-filter is applied, for example, if the variance of the range measurements is too high. In such cases, the post-filter module 44 is applied to filter out range measurements that are outside a threshold range of range measurement. In another example, a post-filter 44 is applied if there is a requirement to limit the range measurements distance-wise (e.g., allowing range measurements from 20 to 400 meters only). In one embodiment, the filtered range measurements $r_i$ along with other sensors' measurements are sent to the position fusion engine 45. In another embodiment, an estimated range based on all filtered range measurements and other sensors' measurements, is fed into the position fusion engine 45.

In an embodiment, each of the infrastructure devices 12, 13, and 14 is associated with a processor 49 comprising a ranges module 41, a pre-filter module 42, a range tracker module 43, and a post filter module 44. The processors (e.g., 49) associated with different infrastructure devices can be located at their corresponding infrastructure devices, within the vehicle 11a, within the first device 11, or in a cloud based processing system.

In an embodiment, more than one infrastructure device may be used for estimating the range. For example, infrastructure devices 12, 13 and 14 can be used to transmit signals to the first device 11. Alternatively, the first device 11 can transmit signals to multiple infrastructure devices 12, 13 and 14. For each of the infrastructure devices 12, 13 and 14, a set of range measurement is obtained. The obtained set of range measurements are fed to the corresponding processors 49 (separate for each infrastructure device). Each of the corresponding processors 49 provides an estimated range. The estimated ranges from each of the processors 49 corresponding to multiple infrastructure devices 12, 13 and 14 are then fed to the position fusion engine 45 for position estimation.

In an embodiment, the post-filter module 44 corresponding to each of the infrastructure devices are configured to restrict or allow the corresponding estimated range from feeding into the position fusion engine 45. This post-filtering is based on one or more dynamic filtering criteria, e.g. restricting or allowing an estimated range corresponding to an infrastructure device from entering the position fusion engine 45 based on the variance of the estimated range or based on an allowed range (e.g. 20 m to 400 m) or based on a power threshold. Therefore, some infrastructure devices can be filtered out from contributing towards determining the position of the vehicle 11a.

In an embodiment, the position fusion engine 45 may be a part of the first vehicle-based device 11. In another embodiment, the position fusion engine 45 may be a part of a cloud based processing system.

In will be appreciated that in the embodiment where a single or more infrastructure device is used to estimate the range information, additional data can be used to determine the position of the vehicle 11a. The additional information can comprise, e.g., a rough estimate of the vehicle's position from GNSS, vehicle speed data, and vehicle direction of motion data etc. The estimated range from the single infrastructure device along with the additional information can be fed to the position fusion engine 45 for determining the position co-ordinates of the vehicle 11a.

In an embodiment, a speed sensor forms part of an onboard vehicle location system, and can in some embodiments include existing speedometer technology. Alternatively, a dedicated speed sensor may be retrofitted. In another embodiment, the speed data can be obtained from the odometer that is available on most vehicles nowadays. The vehicle can provide this information in its Basic Safety Message (which contains speed). It is important to note that the system disclosed in this application can work without using the speed sensor derived information.

The speed sensor feeds speed signals to a speed input module 47 which are in turn fed into the position fusion engine 45, and signals from other sensors including IMU (inertial measurement units) and GNSS sensors are similarly fed into the position fusion engine 45 via the other sensor input module 48. The position output of the position fusion engine 45 is fed back into the range tracker 43 via feedback loop 46 which along with the additional inputs 47 and 48 ensure greater accuracy in the position estimation data, which is output by the position fusion engine 45.

A key aspect of the range measurements obtained over the wireless communication channel is their probability distribution (variance or standard deviation). In a LOS condition (when there are no multi-path extensions), the range measurements simply correspond to the measurement variance (e.g., as if conducted on the bench using RF cables). This standard deviation estimate is in general Gaussian, with the mean value showing the estimate of the range (assuming that there is no bias in the system).

In wireless environment, the probability distribution of the range measurements is no longer Gaussian because of over-ranging measurements caused by non-LOS path components (in other words, caused by multi-path extensions). The probability distribution looks more like a Rayleigh distribution where the overall range is a function of the magnitude of all the range measurements including LOS and non-LOS path components. It is to be noted that each of the LOS and non-LOS paths may have a Gaussian distribution of their own. This distribution is itself a function of time and space, i.e. it has a different realization over time and distance between the Tx and Rx.

In the range tracker module 43, range processing is done on a vector of range measurements $R=[r_1, r_2, r_3, \ldots r_N]$, where vector R has N number of ranges corresponding to their arrival time $T=[t_1, t_2, t_3, \ldots, t_N]$. In one embodiment, these ranges are received regularly with a certain sampling period (e.g. 0.1 sec). In addition, the speed vector (component of the speed of the vehicle in the direction of the range between the moving vehicle and positioning device) for each arrival time $S=[s_1, s_2, s_3, \ldots, s_N]$. The vector S can be derived using the current known position p(x,y,z), the known position of the infrastructure device (a (x,y,z)) and raw speed sensor (vs) (refer to section 3 for details).

It will be appreciated that the processing system 16 of FIG. 4 can be a distributed processing system. The various modules/elements of the processing system 16 can either be located at a single site or distributed at various sites. For example, some modules/elements of the processing system 16 may be part of the infrastructure device or the first device (e.g., elements 41-44) whereas other modules/elements (such as position fusion engine 45) may be part of a common processing system, the first device 11, or the vehicle 11a. In other embodiments, the processing system 16 may be a cloud-based processing system or may be based inside the vehicle 11a or associated with various infrastructure elements, or may be both vehicle- and infrastructure-based.

Figure 9:
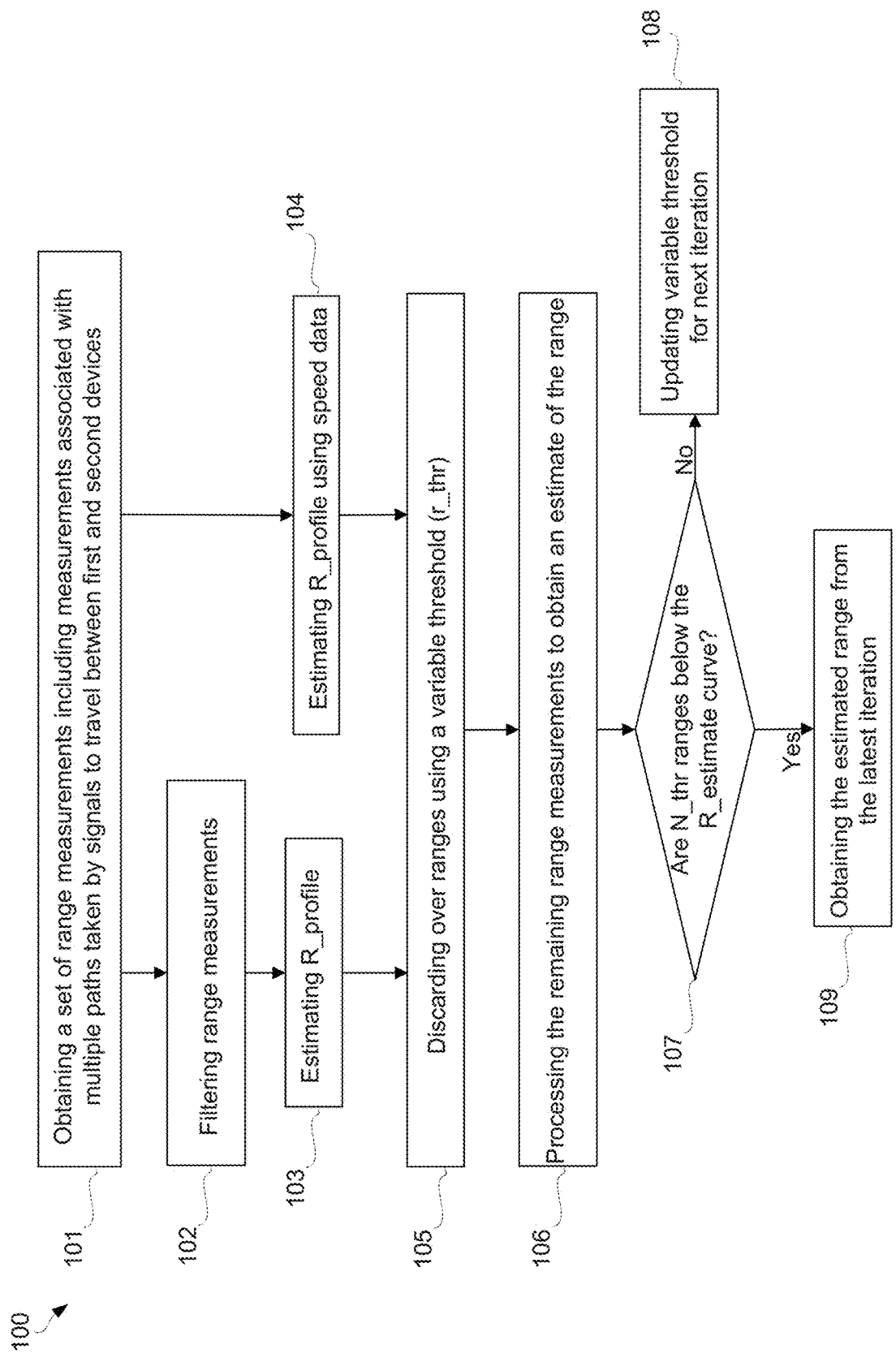
FIG. 9 shows a flow diagram comprising the method steps for estimating range between a first device and a second device using at least one wireless communication channel, in accordance with embodiments of the invention.

FIG. 9 shows a flow diagram comprising the steps of a method 100 for estimating range between a first device and a second device using at least one wireless communication channel. This flow diagram provides two different embodiments for estimating range. The range tracker module 43 uses the method steps of either of these two embodiments for processing the range measurements $r_i$ to estimate the range between two objects.

At step 101, a set of range measurements $r_i$ is obtained by the range tracker module 43. The set of range measurements are obtained via the wireless communication channel and can include measurements associated with multiple paths taken by the signals to travel between the first and second devices. Obtaining the set of range measurements can include:
a) Receiving a range vector R having N range measurements, and
b) Receiving a time vector T corresponding to range measurements' arrival time T.

In an embodiment, if speed data is available, the range tracker module 43 also receives a speed vector S having N measurements corresponding to time T from the speed input module 47 at this step.

In a first embodiment (where speed data is not available), at step 102, the range vector R is filtered. In one example, a median filter with a given window length K and percentile threshold P_thr can be used for filtering the range vector R. For example in an embodiment, K can be 11 and P_thr can be 30%. There is no restriction on the value of K which can be constant or dynamic. In an embodiment, the value of K is dynamic and depends on the sampling interval and the dynamics of the environment. In an embodiment, the value of P_thr is between 0-100%. In a preferred embodiment, P_thr is between 20-40%.

The filtered range vector is denoted as R_median. A range profile estimate is then obtained using regression. The shape of the range curve with respect to time vector T is defined as R_profile. At step 103, a second or third order least square fit for the data (R_median, T) is used to estimate R_profile. In another embodiment, R_profile is estimated directly from vector R, i.e., by least square fitting of (R, T). Following are the examples of least square fitting functions.

Line LS estimate: X=[ones(N), T_norm] and R_profile=pinv(X) R_median,
Quadratic LS estimate: X=[ones(N), T_norm, T_norm.^] and R_profile=pinv(X)R_median,
where $pinv(X)=(X'X)^{-1} X'$ and T_norm=T−t_N.

Alternatively, if speed data is available (e.g., because one of the first and second devices is moving and has a speed sensor attached to it), then at step 104, the range profile can be accurately estimated using the speed data (described in detail in section 3).

$$r\_est_i = \Sigma_1^i s_i dt_i, \quad (1)$$

where $dt_i = t_i - t_{i+1}$, $$R\_profile = [r\_est_i \ldots, r\_est_i, \ldots, r\_est_N]. \quad (2)$$

At step 105, the over-ranges caused by multiple paths are discarded using a variable threshold r_thr. In an embodiment, the process of discarding the over-ranges caused by multiple paths is iterative. In a first iteration, R_estimate is calculated using equation:

$$R\_estimate = R\_profile + r\_thr \quad (3)$$

(initiation of step 106 in FIG. 9)
where, r_thr is a dynamic value that is updated at the end of every iteration. In an embodiment, r_thr is initialized (at step 106) as a mean or median value of the R vector.

In the following iterations, the R_profile+r_thr line is moved up and down with respect to the R vector line. A condition is defined (at step 107) to decide when to stop the iterative process. The iterative process is stopped (for example at step 109) when there is only N_thr range measurements from the original R vector left below the R_profile+r_thr line. N_thr defines a point where the iterative process needs to be stopped. In other words, the iterative process is stopped when the line R_estimate=R_profile+r_thr only contains N_thr values under its curve. Otherwise, the iterative process is carried on as shown at step 108.

In an embodiment, N_thr can be a fixed percentile value e.g. 25% of N wherein N is the original number of range measurements in the R vector. In an embodiment, N_thr is 25% of N or more.

In another embodiment, N_thr can be a function of variance of the error between the R_profile and R denoted as r_var, wherein r_var can be stored from the previous run of the Range Tracker.

For example, if the number of range measurements N is 40 and N_thr is selected to be e.g. 25% of N, then N_thr=10.

At step 109, the final estimated range is obtained. The final estimated range is the latest R_estimate element derived from the above iterative process or a predicted estimate based on the R_estimate line.

In alternative embodiments, any other efficient iterative procedure like a binary tree algorithm can also be used for the iterative process of steps 105-109. The iterative process of steps 105-109 can be replaced by the binary tree algorithm if, for example, the number of elements in the R vector are monotonically increasing over the range min (R) to max (R).

The above algorithm can be efficiently implemented. Most of the data is already stored in certain fashion in different intermediate steps, for example, addition of range into sorted R vector is faster than performing sorting every time (e.g. when implementing the median filter based on a percentile). Similarly, the iterative step to detect the threshold can use the previous estimated threshold as a starting point. In addition, as the function number of elements in R is monotonic over the range of values of R, binary search could be employed as an efficient implementation.

The switch between different range profile methods (line, quadratic, or speed (dr/dt)) could be configured or switched based on different states of the system. In one embodiment, line method can be used during initialisation, while the speed (dr/dt) based method can be used in steady state, when the system is within a known error bound.

Figure 5:
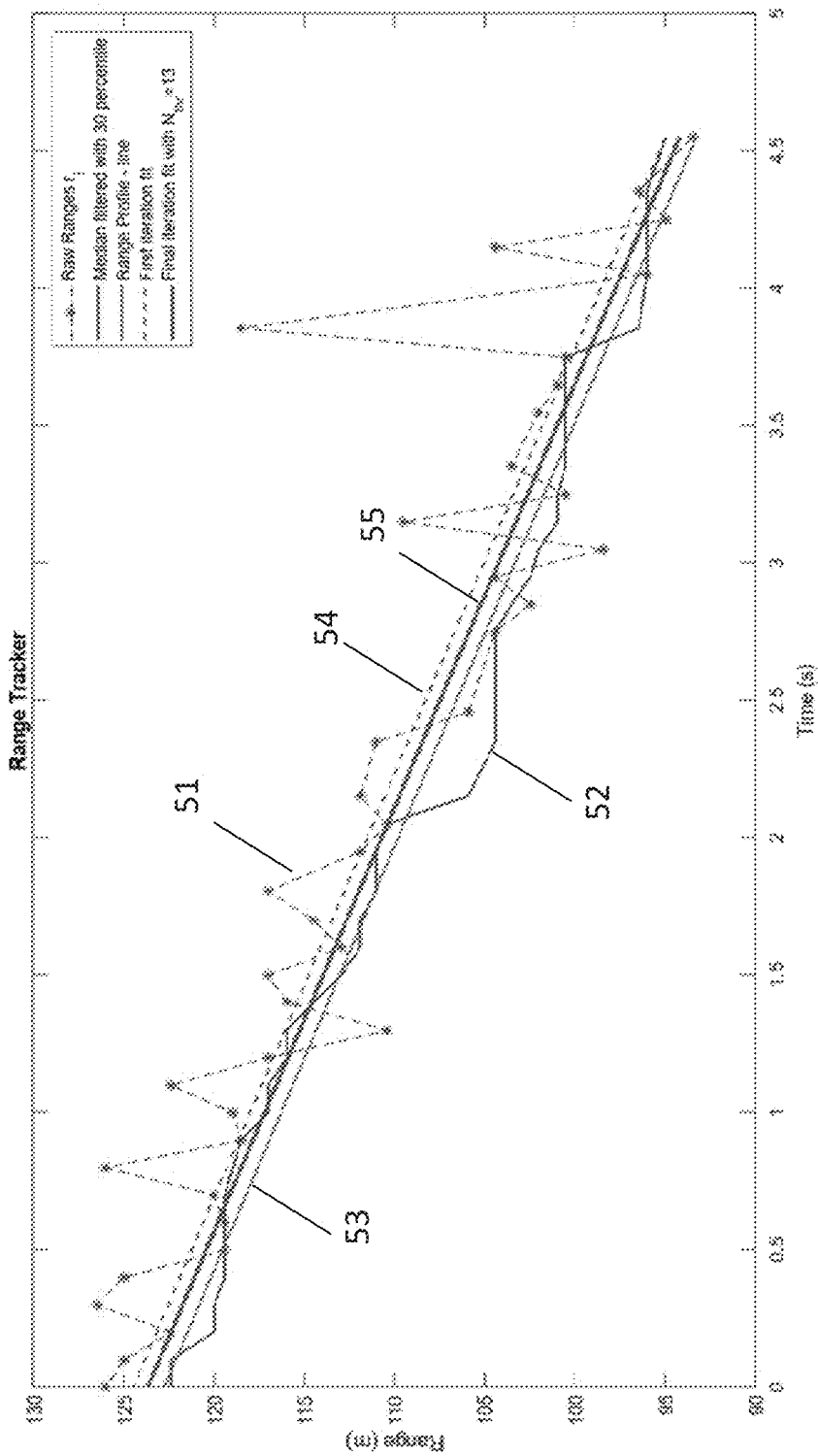
FIGS. 5-8 show implementation of an algorithm to discard over-ranges caused by multi-path extensions using a variable threshold to obtain an estimate of the range.

As an example, the algorithm is explained in FIGS. 5 to 8. FIG. 5 shows linear regression based range profile fitting. In this figure, the dotted line 51 with asterisks represents the raw range measurements i.e. the plot of range vector R with respect to time vector T. Solid line 52 represents vector R_median, that is the output of the median filter with P_thr=30% and K=11. The line 53 shows the curve of the R_profile which is derived by implementing the least square fitting function to R_median vector shown by line 52. The dotted line 54 shows R_estimate that is obtained after the completion of the first iteration. The line 55 is for final vector R_estimate for N_thr=13 (approximately 32% of N). It is to be noted that N_thr remains fixed once chosen for a particular run of range tracker but it can change between each run of range tracker module.

Figure 6:
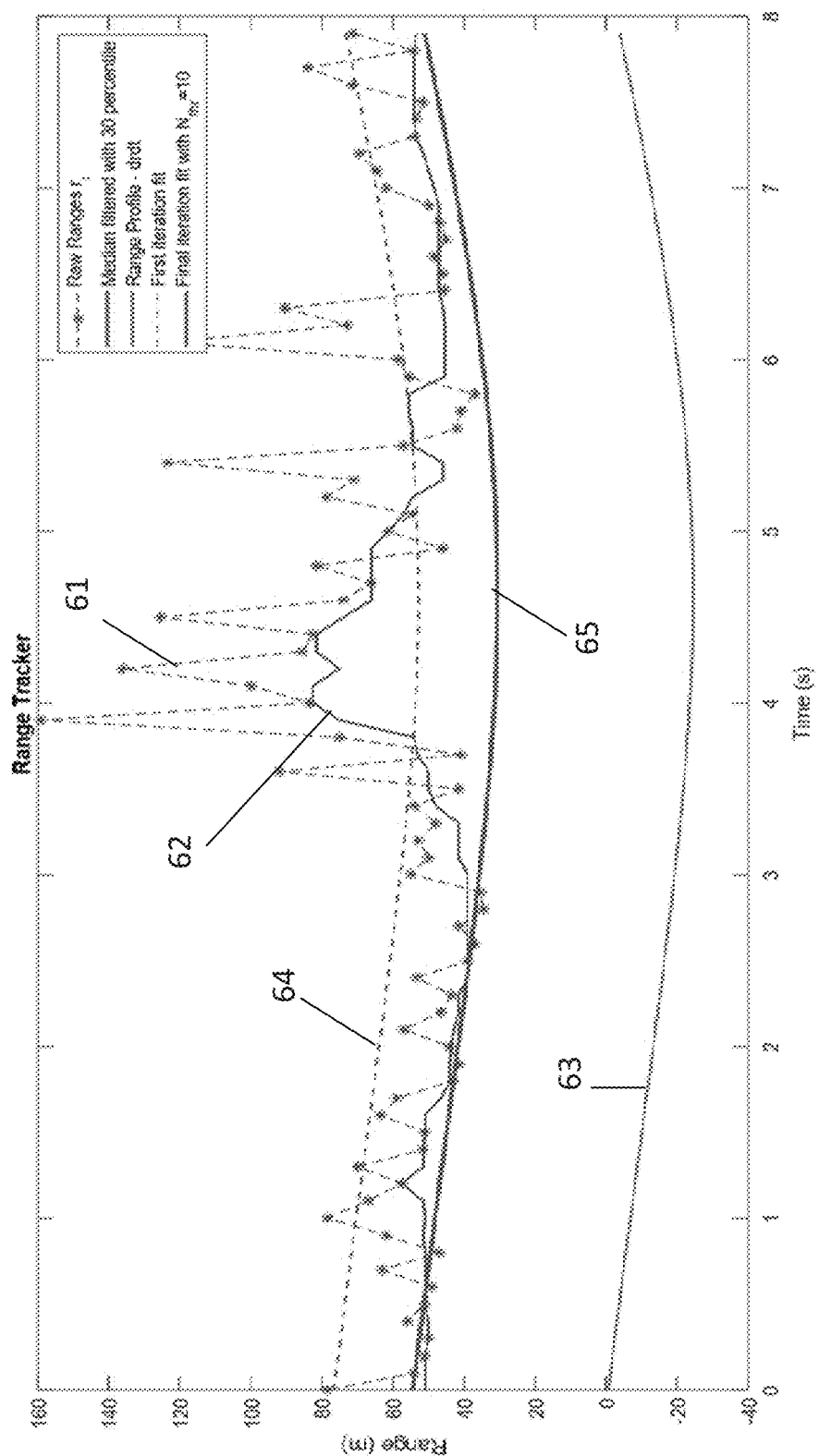

FIG. 6 shows speed (dr/dt) based range profile fitting. In this figure, the dotted line 61 with asterisks represents the raw range measurements i.e. the plot of range vector R with respect to time vector T. Solid line 62 represents vector R_median, that is the output of the median filter with P_thr=30% and K=11. The line 63 shows the curve of the R_profile which is derived from speed data (dr/dt). The speed based R_profile 63 was able to preserve the curve nature of the line. The dotted line 64 shows R_estimate that is obtained after the completion of the first iteration. The line 65 is for final vector R_estimate for N_thr=10 or 25% of N. This graph is an example of an OBU (On-Board Unit attached to a vehicle) is moving towards an RSU (during 0-3 sec), the OBU reaches the RSU (during 4-5 sec) and then drives away (during 5.5 to 8 sec). Without the present estimation procedure, it would be estimated as a straight line using normal regression method, therefore, leading to significant degradation in positioning performance.

Figure 7:
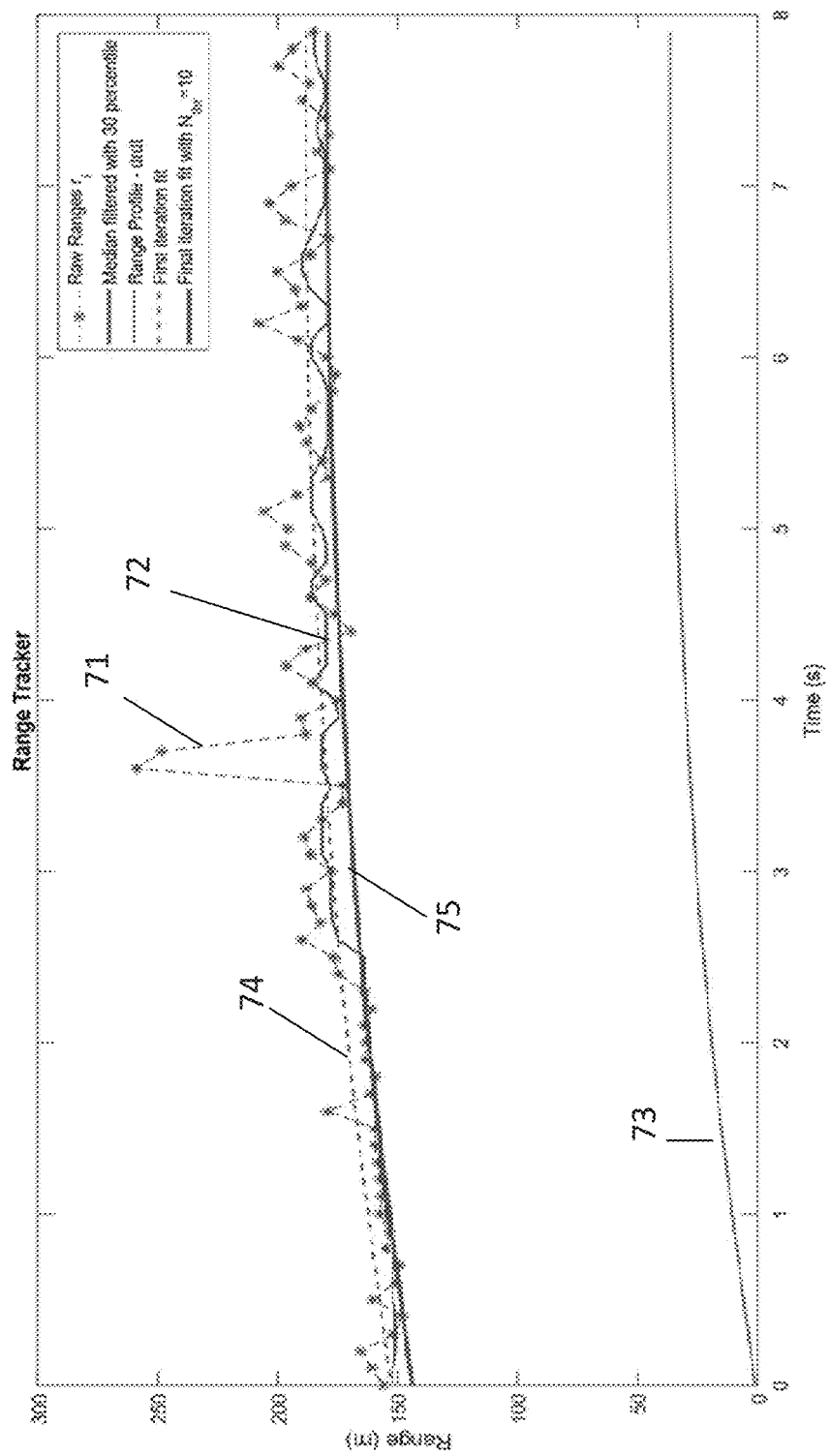
Figure 8:
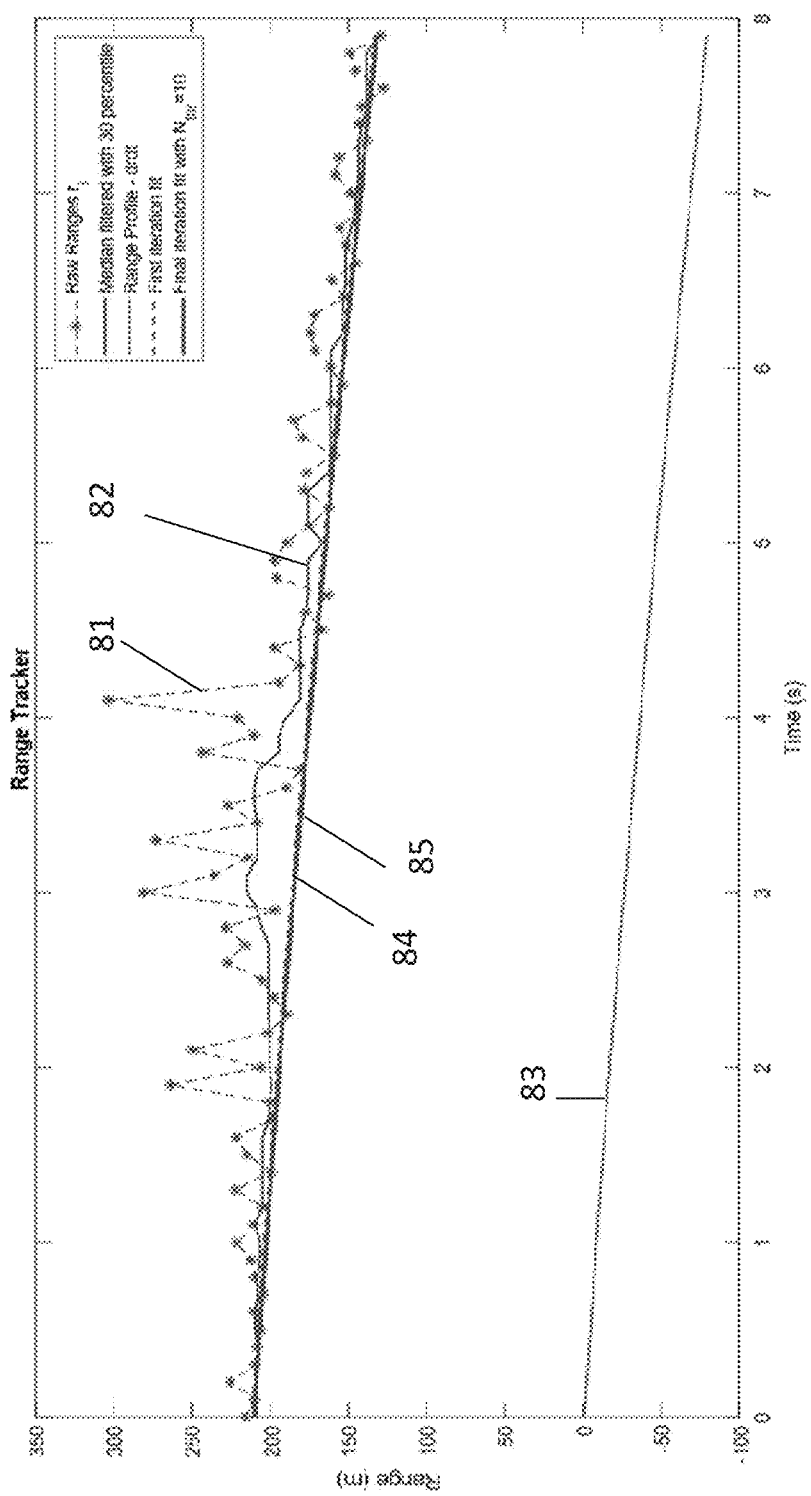

In FIG. 7 and FIG. 8, the reference numerals 71-75 and 81-85 refer to R vector, R_median, R_profile, R_estimate obtained after first iteration, and final R_estimate respectively. In these figures, the dr/dt based range tracker profiles (R_profiles 73 and 83) are obtained from a speed sensor. The main observation is that the range extensions (spikes in the * lines) are excluded as can be seen from the middle section of FIG. 8. (from 2.5 to 4 sec.). Similar observations can be observed in FIG. 7 (from 3.5 to 4 sec) and in FIG. 6 (from 3.5 to 5 sec).

If the speed data is available, then the range measurements can be refined using the speed data. If the current position of the vehicle is $p_i$ (x,y,z) and the position of the infrastructure device (RSU/AP/UWB Anchor) as $a_i$ (x,y,z) at time instant $t_i$, where i is sample number. Then the vector from $a_i$ to $p_i$ is $r_i = p_i - a_i$ is the range vector with magnitude of $r = \|p_i - a_i\|$. Denoting the velocity vector of the vehicle as $v_i$ (x,y,z) which can be derived from the vehicle speed $vs_i$. Lastly, we want the component of the speed along $r_i$, which can be obtained by simple vector projection $s_i = v_i . r_i / r_i$ where "." is a vector dot product.

Denoting R, S, and T as range, speed and time vectors where, $R=[r_1, r_2, r_3, \ldots, r_N]$, $S=[s_1, s_2, s_3, \ldots, s_N]$ and $T=[t_1, t_2, t_3, \ldots, t_N]$. Let dT be the difference vectors for time vector T. As speed is defined as the distance over time i.e.

$$s = \frac{dr}{dt} => r = \int s\, dt.$$

Therefore, the shape of the ranges, i.e. R_profile, can be obtained by $R[i] = \Sigma_1^i S[i] dT[i]$.

In an embodiment, the vehicle speed could just be used to estimate the slope of the line for a simple linear line regression based range profile. In another embodiment, the R_profile can be easily obtained from the odometer information.

The wireless channel is quite dynamic and, therefore, selecting a subset of range measurements based on a fixed threshold N_thr (e.g. say 35%) is not optimal for every scenario. Therefore, a variance based variable threshold may be used. Once the range estimate R_estimate (fit to the ranges vector R) is obtained from the Range Tracker algorithm, the variance of the ranges is estimated by removing the shape (induced by the motion of the vehicle) as Range_Var=var(R−R_estimate). In some embodiments, this variance can be further limited to curtail the impact of over-ranges. These limitations can also be based on the range estimate variation of a sensor e.g. range variance based on Additive White Gaussian Noise (AWGN) channel.

This estimated range variance can be used to select the number of samples to discard (N_thr) in a given range measurement vector R for a fit.

Various sensors can be used to ascertain that the vehicle is stationary (i.e. not moving). For example, vehicle speed ticks or inertial sensors. If this information is known, then multiple enhancements of the range filtering algorithm are possible. For example, the predicted range at the onset of stationarity can be held. This can be done using a horizontal line fit or a dr/dt line as described above (it is evident that when the vehicle is stationary, the dr/dt profile is a horizontal line). In this case, the range shape could be considered a constant horizontal line.

As already discussed, the range vector R is pre-filtered using some criterion-based filter (by the pre-filter module 42) before feeding it to the range tracking algorithm 43. In a similar way, it can also be post-filtered (see post filter 44 in FIG. 4) based on certain criteria before being fed into positioning fusion engine 45.

Some examples of such pre-filtering include:
a) Received packet signal strength-based filtering (e.g. only select ranges above a certain threshold say—90 dBm). This criterion is a crude multi-path indicator especially if used in conjunction with the wireless path loss model. For example, if the path loss model calculated received power for the measured range is not within received measured power (with certain limits) then this may indicate a multi-path infected range.

b) If the range estimate is not within a certain threshold of the current range vector standard deviation (e.g. discard if three times the std. dev.)

c) If the vehicle is stationary, a bad static position can induce very static multi-path extension. This can be avoided by discarding the ranges.

Some post tracking algorithm filtering examples:

d) In case the variance is too high, discard the predicted range. This could be helpful in situations where a positioning system is trying to only use estimate with low variance. E.g. given a choice of 5 or more RSUs/APs, a position fusion engine 45 may select 3 ranges in ascending order of range variance.

e) Discard the predicted range (from the tracker) if it is too far away from the current range based on the current position. Other sensors, such as speed sensor can be used in conjunction for validation.

f) Only allow ranges from RSUs which are close (e.g. limit the ranges from far-away RSUs) by allowing the ranges which are within a specified range (5 m to 300 m).

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A method comprising:
obtaining a set of range measurements from a first device using a wireless communication channel, wherein the range measurements include measurements associated with multiple paths taken by signals between a first device and a second device;
estimating a preliminary range profile using regression or speed data of at least one of the first device and the second device;
discarding over-ranges caused by multiple signal paths from the set of range measurements using a variable threshold, wherein the variable threshold is determined based on the set of range measurements;
obtaining an estimated range between the first device and the second device, where the estimated range is a sum of the preliminary range profile and the variable threshold;
iterating the steps of discarding the over-ranges and obtaining the estimated range, wherein the variable threshold is updated at the end of each iteration and the updated variable threshold is determined based on range measurements remaining in the set of range measurements after over-ranges are discarded in a previous iteration;
stopping the iteration when a threshold number of range measurements from the set of range measurements are left below a curve of the estimated range obtained from a previous iteration; and
obtaining a final estimated range, the final estimated range being the estimated range in the last iteration.

2. The method of claim 1, wherein the threshold number of range measurements is a fixed percentile value of total number of measurements in the set of range measurements.

3. The method of claim 1, wherein the method comprises a pre-processing step that is performed prior to the discarding of the over-ranges.

4. The method of claim 3, wherein the pre-processing step comprises filtering the over-ranges using a median filter.

5. The method of claim 4, wherein the median filter is configured to filter over-ranges using a window length K and a percentile threshold P_thr.

6. The method of 3, wherein the pre-processing step comprises the step of using line or quadratic or spline fit on the set of range measurements to obtain the preliminary range profile.

7. The method of claim 1, further comprising filtering the estimated range based on standard deviation/variance of the estimated range.

8. A system comprising:
a receiver configured to obtain a set of range measurements from a first device using a wireless communication channel, wherein the range measurements include measurements associated with multiple paths taken by signals in the wireless communication channel to travel between the first device and a second device, and
a processing system comprising:
a range tracker module configured to:
estimate a preliminary range profile using regression or speed data of at least one of the first device and the second device; and
discard over-ranges caused by multiple paths from the set of range measurements using a variable threshold, wherein the variable threshold is determined based on the set of range measurements; and
a position fusion engine module configured to obtain an estimated range, where the estimated range is a sum of the preliminary range profile and the variable threshold;
the processing system further configured to:

iterate the steps of discarding the over-ranges and obtaining the estimated range, wherein the variable threshold is updated at the end of each iteration and the updated variable threshold is determined based on range measurements remaining in the set of range measurements after over-ranges are discarded in a previous iteration;

stop the iteration when a threshold number of range measurements from the set of range measurements are left below curve of the estimated range obtained from a previous iteration; and obtain a final estimated range, the final estimated range being the estimated range in the last iteration.

9. The system of claim 8, wherein the second device is configured to obtain the set of range measurements from the first device.

10. The system of claim 8, wherein the second device is an infrastructure device of the system configured to transmit/receive signals to/from other devices, and the first device is fitted to a vehicle.

11. The system of claim 8, wherein the threshold number of range measurements is a fixed percentile value of total number of measurements in the set of range measurements.

12. The system of claim 8, wherein the range tracker module is configured to perform pre-processing of the set of range measurements prior to performing the step of discarding over-ranges.

13. The system of claim 12, wherein the range tracker module is configured to perform pre-processing for filtering the over-ranges using a median filter.

14. The system of claim 13, wherein the median filter is configured to filter over-ranges using a window length K and a percentile threshold P_thr.

15. The system of claim 8, wherein the system is configured to estimate range either when both the first and second devices are stationary or when one of the devices is moving and the remaining device is stationary.

16. The system of claim 15, further comprising a speed sensor for obtaining the speed measurements of the moving device.

17. The system of claim 8, further comprising a post-filter module to filter the estimated range based on standard deviation/variance of the estimated range.

18. The system of claim 8, wherein the range tracker module is configured to perform pre-processing step using line or quadratic or spline fit on the set of range measurements or on the median filtered range measurements to obtain the preliminary range profile.

19. A non-transitory computer readable program comprising instructions, which when performed by a processing system, cause the processing system to perform the steps of:

obtaining a set of range measurements from a first device using a wireless communication channel, wherein the range measurements include measurements associated with multiple paths taken by signals between a first device and a second device;

estimating a preliminary range profile using regression or speed data of at least one of the first device and the second device;

discarding over-ranges caused by multiple signal paths from the set of range measurements using a variable threshold wherein the variable threshold is determined based on the set of range measurements;

obtaining an estimated range between the first device and the second device, where the estimated range is a sum of the preliminary range profile and the variable threshold;

iterating the steps of discarding the over-ranges and obtaining the estimated range, wherein the variable threshold is updated at the end of each iteration and the updated variable threshold is determined based on range measurements remaining in the set of range measurements after over-ranges are discarded in a previous iteration;

stopping the iteration when a threshold number of range measurements from the set of range measurements are left below a curve of the estimated range obtained from a previous iteration; and obtaining a final estimated range, the final estimated range being the estimated range in the last iteration.

* * * * *